United States Patent
Chi et al.

(10) Patent No.: US 8,140,706 B2
(45) Date of Patent: *Mar. 20, 2012

(54) SYSTEMS AND METHODS FOR IDENTIFYING USER TYPES USING MULTI-MODAL CLUSTERING AND INFORMATION SCENT

(75) Inventors: Ed Chi, Palo Alto, CA (US); Jeffrey Heer, Berkeley, CA (US); Peter Pirolli, San Francisco, CA (US)

(73) Assignee: Xerox Corporation, Norwalk, CT (US)

( * ) Notice: Subject to any disclaimer, the term of this patent is extended or adjusted under 35 U.S.C. 154(b) by 827 days.

This patent is subject to a terminal disclaimer.

(21) Appl. No.: 11/882,839

(22) Filed: Aug. 6, 2007

(65) Prior Publication Data

US 2007/0276961 A1 Nov. 29, 2007

Related U.S. Application Data

(63) Continuation of application No. 09/820,988, filed on Mar. 30, 2001, now Pat. No. 7,260,643.

(51) Int. Cl.
  *G06F 15/16* (2006.01)
  *G06F 15/173* (2006.01)
(52) U.S. Cl. ............ 709/241; 709/217; 709/238
(58) Field of Classification Search .......... 709/217–219, 709/223, 224, 238–244
See application file for complete search history.

(56) References Cited

U.S. PATENT DOCUMENTS

| | | | |
|---|---|---|---|
| 5,835,905 A | 11/1998 | Pirolli et al. | |
| 5,878,384 A | 3/1999 | Johnson et al. | |
| 6,029,195 A | 2/2000 | Herz | |
| 6,067,565 A | 5/2000 | Horvitz | |
| 6,154,767 A | 11/2000 | Altschuler et al. | |
| 6,167,397 A | 12/2000 | Jacobson et al. | |
| 6,356,898 B2 | 3/2002 | Cohen et al. | |
| 6,385,641 B1 | 5/2002 | Jiang et al. | |
| 6,421,733 B1 | 7/2002 | Tso et al. | |
| 6,430,558 B1 | 8/2002 | Delano | |
| 6,581,072 B1 | 6/2003 | Mathur et al. | |

(Continued)

FOREIGN PATENT DOCUMENTS

EP 1 024 437 A2 8/2000

OTHER PUBLICATIONS

B. A. Huberman, P. Pirolli, J. Pitkow and R. J. Lukose (1998). Strong Regularities in World Wide Web Surfing. Science 280: 95-97.

(Continued)

*Primary Examiner* — Wing Chan
*Assistant Examiner* — David X Yi
(74) *Attorney, Agent, or Firm* — Oliff & Berridge, PLC

(57) ABSTRACT

Techniques for determining user types based on multi-modal clustering are provided. The topology, content and usage of a document collection or web site is determined. The user paths are identified using longest repeating subsequence techniques and a multi-modal information need vector is determined for each significant user path. Multi-modal vectors for each document in the significant path, content, uniform resource locators, inlink and outlink multi-modal vectors are determined and combined based on path position and access frequency. Multi-modal clustering is performed based on a multi-modal similarity function and a specified measure of similarity using a type of multi-modal clustering such as K-means or wavefront clustering. The identified clusters may be further analyzed based on changes to the weighting of the corresponding content, url, inlinks and outlinks multi-modal feature vectors.

14 Claims, 6 Drawing Sheets

U.S. PATENT DOCUMENTS

| | | |
|---|---|---|
| 6,622,168 B1 | 9/2003 | Datta |
| 6,681,247 B1 | 1/2004 | Payton |
| 6,728,932 B1 | 4/2004 | Chundi et al. |
| 6,982,708 B1 | 1/2006 | Mah et al. |
| 7,010,527 B2 | 3/2006 | Alpha |
| 7,017,110 B1 | 3/2006 | Chi et al. |
| 7,020,643 B2 | 3/2006 | Mah et al. |
| 7,028,053 B2 | 4/2006 | Chi et al. |
| 7,031,961 B2 | 4/2006 | Pitkow et al. |
| 7,039,642 B1 | 5/2006 | Horvitz et al. |
| 7,043,475 B2 | 5/2006 | Heer et al. |
| 7,043,535 B2 | 5/2006 | Chi et al. |
| 7,043,702 B2 | 5/2006 | Chi et al. |
| 7,194,466 B2 | 3/2007 | Chen et al. |
| 7,203,899 B2 | 4/2007 | Chi et al. |
| 2003/0167443 A1 | 9/2003 | Meunier et al. |
| 2005/0144067 A1 | 6/2005 | Farahat et al. |

OTHER PUBLICATIONS

Ed H. Chi, Peter Pirolli, James Pitkow. The Scent of a Site: A System for Analyzing and Predicting Information Scent, Usage, and Usability of a Web Site. In Proc. of ACM CHI 2000 Conference on Human Factors in Systems, pp. 161-168,581, 582. ACM Press, 2000. Amsterdam, Netherlands.

P. Pirolli and J. E. Pitkow (1999). Distributions of Surfers' Paths Through the World Wide Web: Empirical Characterization. World Wide Web 2(1-2): 29-45.

J. E. Pitkow and P. Pirolli (1999). Mining longest repeated subsequences to predict World Wide Web surfing. Second USENIX Symposium on Internet Technologies and Systems.

System and Method for Information Browsing Using Multi-Modal Features. Francine R. Chen, Hinrich Scheutze, Ullas Gargi. Oct. 19, 1999.

System and Method for Providing Recommendations Based on Multi-Modal User Clusters. Hinrich Schuetze, James E. Pitkow, Peter L. Pirolli, Ed H. Chi, Jun Li Oct. 19, 1999.

System and Method for Quantitatively Representing Data Objects in Vector Space. Hinrich Scheutze, Francine R. Chen, Peter Pirolli, James E. Pitkow, Ed H. Chi, Jun Li, Ullas Gargi Oct. 19, 1999.

System and Method for Identifying Similarities Among Documents in a Collection. Hinrich Schuetze, Francine R. Chen, Peter L. Pirolli, James E. Pitkow, Ed H. Chi.

System and Method for Clustering Data Objects in a Collection. Hinrich Schuetze, Peter L. Pirolli, James E. Pitkow, Ed H. Chi, Jun Li Oct. 19, 1999.

System and Method for Visually Representing the Contents of a Multiple Data Object Cluster. Hinrich Scheutze, Peter L. Pirolli, James E. Pitkow, Ed H. Chi, Jun Li Oct. 19, 1999.

System and Method for Inferring User Information Need in a Hyermedia Linked Document Collection. Ed H. Chi et al.

Yuwono, Budi; Lee, Dik L., "Search and Ranking Algorithms for Locating Resources on the World Wide Web," Proceedings of the Twelfth International Conference on Data Engineering, Feb. 26 through Mar. 1, 1996, pp. 164-171.

Picard, Justin, "Modeling and Combining Evidence Provided by Document Relationships Using Probalistic Argumentation Systems," Proceedings of the 21st Annual International ACM SIGIR Conference on Research and Development in Information Retrieval, Aug. 1998, pp. 182-189.

Craswell, Nick; Hawking, David; Robertson, Stephen, "Effective Site Finding Using Link Anchor Information," Proceedings of the 24th Annual International ACM SIGIR Conference on Research and Development in Information Retrieval, Sep. 2001, pp. 250-257.

Cetintemel U. et al., "Self-adaptive user profiles for large-scale data delivery" Data Engineering, 2000, Proceedings, $16^{th}$ International Conference on San Diego, CA, USA, Feb. 29-Mar. 3, 2000, Los Alamitos, CA, USA, IEEE Comput. Soc, US, Feb. 29, 2000, pp. 622-633, XP010378759.

| | FROM | | | | | | |
|---|---|---|---|---|---|---|---|
| TO | | 0 | 1 | 2 | 3 | 4 | 5 | 6 |
| | 0 | | | | | | | |
| | 1 | 1 | | | | | 1 | |
| | 2 | | 1 | | | | | |
| | 3 | | 1 | 1 | | | | |
| | 4 | | | | | | | |
| | 5 | | 1 | | | 1 | | 1 |
| | 6 | | | | | 1 | 1 | |

TOPOLOGY MATRIX T

SYSTEMS AND METHODS FOR IDENTIFYING USER TYPES USING MULTI-MODAL CLUSTERING AND INFORMATION SCENT

This is a Continuation of application Ser. No. 09/820,988 filed Mar. 30, 2001. The disclosure of the prior application is hereby incorporated by reference herein in its entirety.

GOVERNMENT LICENSE PROVISION

The U.S. Government has a paid-up license in this invention and the right in limited circumstances to require the patent owner to license others on reasonable terms as provided for by the terms of Contract No. N00014-96-C-0097 awarded by the Office of Naval Research.

INCORPORATION BY REFERENCE

The following co-pending applications:
"SYSTEMS AND METHODS FOR PREDICTING USAGE OF A WEB SITE USING PROXIMAL CUES", by E. Chi et al., filed March 30, as U.S. application Ser. No. 09/820,706;
"SYSTEMS AND METHOD FOR INFORMATION BROWSING USING MULTI-MODAL FEATURES", by F. Chen et al., filed Oct. 19, 1999, now issued as U.S. Pat. No. 6,728,752;
"SYSTEM AND METHOD FOR PROVIDING RECOMMENDATIONS BASED ON MULTI-MODAL USER CLUSTERS", by H. Schuetze et al., filed Oct. 19, 1999, now issued as U.S. Pat. No. 6,567,797;
"SYSTEM AND METHOD FOR QUANTITATIVELY REPRESENTING DATA OBJECTS IN VECTOR SPACE", by H. Schuetze et al., filed Oct. 19, 1999, as U.S. application Ser. No. 09/421,416;
"SYSTEM AND METHOD FOR IDENTIFYING SIMILARITIES AMONG DOCUMENTS IN A COLLECTION", by H. Schuetze et al., filed Oct. 19, 1999 as U.S. application Ser. No. 09/425,039;
"SYSTEM AND METHOD FOR CLUSTERING DATA OBJECTS IN A COLLECTION", Schuetze et al., filed Oct. 19, 1999, now issued as U.S. Pat. No. 6,598,054;
"SYSTEM AND METHOD FOR VISUALLY REPRESENTING THE CONTENTS OF A MULTIPLE DATA OBJECT CLUSTER", by H. Schuetze et al., filed Oct. 19, 1999, now issued as U.S. Pat. No. 6,564,202; are each incorporated herein by reference in the entirety.
"SYSTEM AND METHOD FOR PREDICTING THE USAGE OF A WEB SITE USING PROXIMAL CUES", by Ed. Chi et al., filed Mar. 30, 2001, as U.S. application Ser. No. 09/820,706;
"SYSTEM AND METHOD FOR INFERRING USER INFORMATION NEED IN A HYPERMEDIA LINKED DOCUMENT COLLECTION" by Ed Chi et al., filed Mar. 31, 2000, as U.S. application Ser. No. 09/540,063, now U.S. Pat. No. 7,017,110; are each incorporated herein by reference in the entirety.

BACKGROUND OF THE INVENTION

1. Field of Invention

This invention relates to computer assisted search and retrieval systems and systems and methods for determining the types of users visiting a document collection or web site.

2. Description of Related Art

The ability to manage information is increasingly important in the modern information economy. As the reach of corporate information systems is extended to suppliers and customers, timely access to corporate information repositories becomes critical. Therefore, web site designers and information architects need to identify the types of users traversing their document collections or web sites. This information is then used to tailor the delivery of information based on the user's needs and the tasks the user must perform. A user's access patterns of a document collection and/or web site may be determined using conventional access information and/or special instrumentation of client access software. For example, Alexa Internet's Toolbar 5.0 system provides for a customized toolbar that is added to the client browser. Using the Toolbar 5.0 product, Alexa Internet is able to compile information regarding a user's path and makes suggestions of a next connection based on the similarity of the current path to accumulated historical browsing information. Similarly IBM's SurfAid product uses On-Line Analytical Processing methods to provide a user with counts of users following traversal paths. The system the attempts to assign each user path to a user path category. However, none of these conventional products provide for integration of the user's information needs as well as other modes of information. Also, none of these conventional systems employ multi-modal clustering to identify user types based on the multiple modes of information available. Instead, IBM's SurfAid Alexa Internet's product merely analyze the user paths directly.

Conventional software packages such as Accrue Corporation's Insight product and NetGenesis Corporation's NetGenesis 5 product provides tools for analyzing product purchases and click-through rates. However, these conventional software packages fail to identify user's tasks and user types and fail to integrate information from the various sources.

SUMMARY OF THE INVENTION

Therefore, the ability to integrate various modes or types of information sources such as the information content of a document collection or web site, the words contained within each document or web page, the inward connections or inlinks, the outward connections or outlinks as well as the URL connections into the analysis of the type of user as wells as usage and topology information to provide information about the type of user and/or user task would be useful.

This invention provides systems and methods for determining user types and/or user tasks for document collections, electronic libraries, web sites and any other collection of documents and/or web pages containing connections or links to other documents and/or web pages.

DETAILED DESCRIPTION OF PREFERRED EMBODIMENTS

Figure 1A:
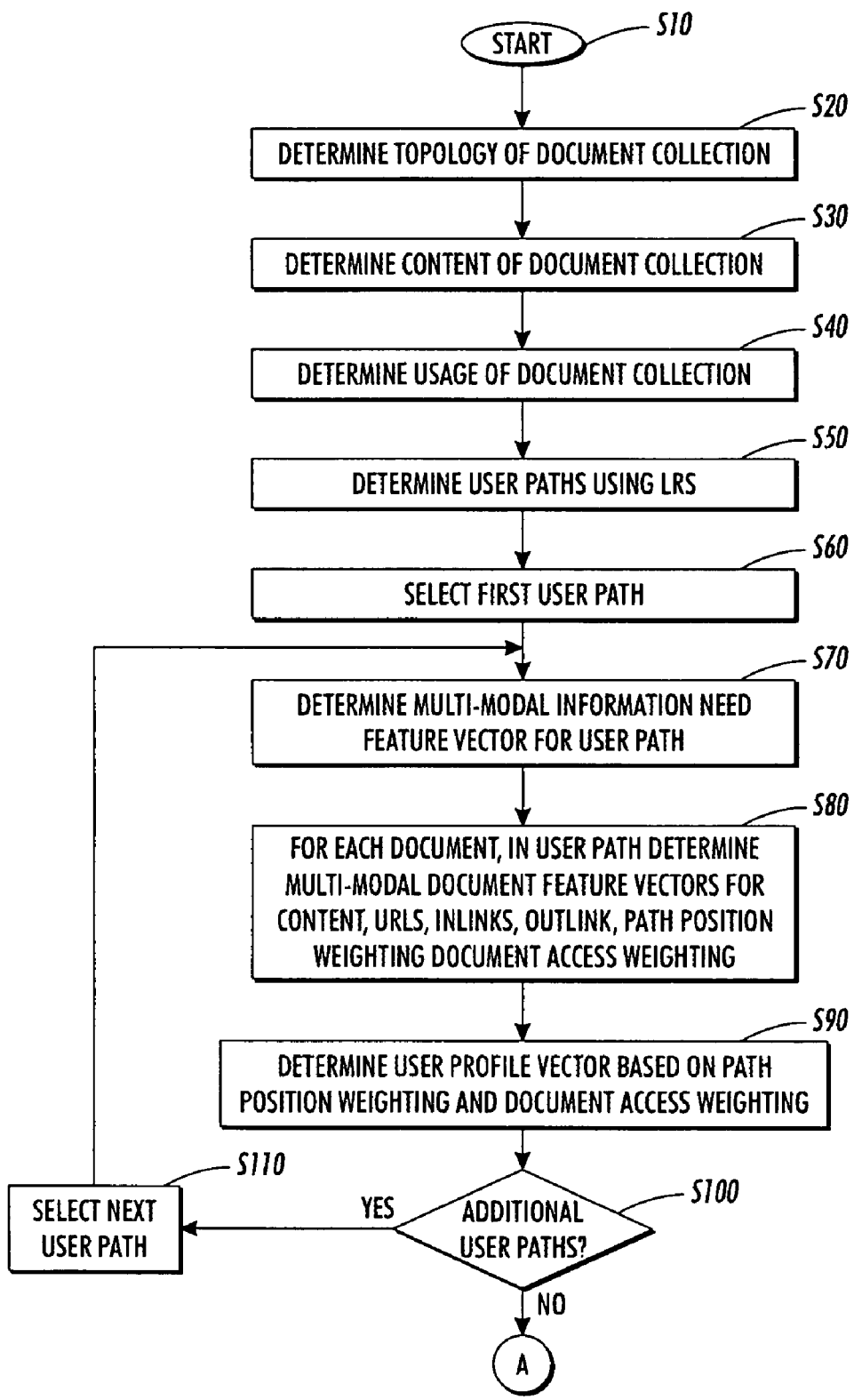
FIG. 1 is an exemplary flowchart of an exemplary method for identifying user types using multi-modal clustering and information scent according to this invention.
Figure 1B:
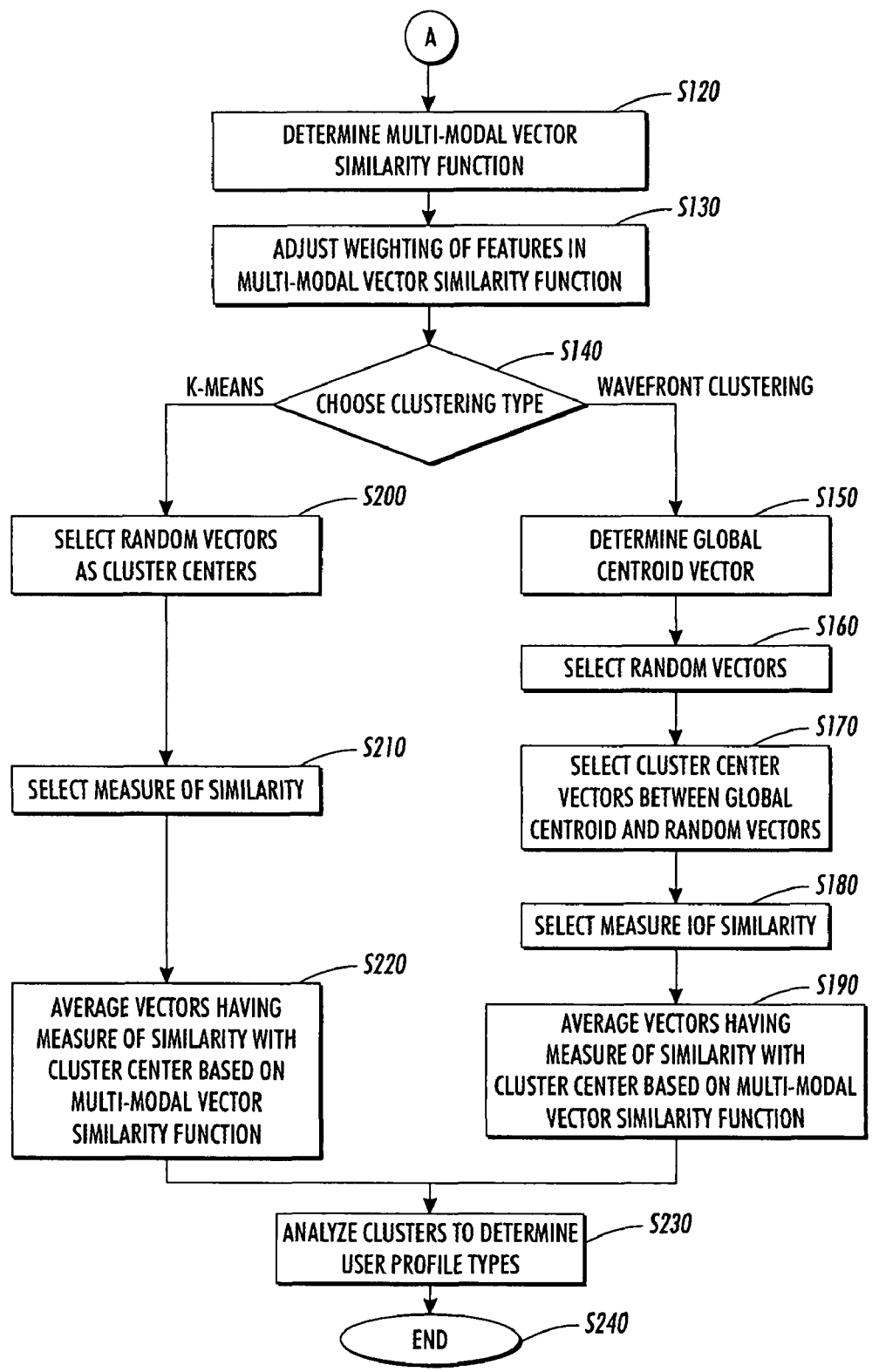

FIG. 1 shows a flowchart of an exemplary embodiment of a method for identifying user types using multi-modal clustering and information scent according to this invention.

The process starts at steps S10 and continues immediately to step S20 where the topology of the document collection or web site 95 is determined. The topology may be determined by traversing the site and identifying connections or links between content portions, documents or web pages. For example, starting at a first document or web page, the documents or web pages connected to, or linked to, the first document or web page are determined. Information indicating an association between the first document or web page and the reachable documents or web pages is stored in a topology data structure. It will be apparent that a topology data structure may include a topology matrix, a topology adjacency list or any other known or later developed technique of storing topology information about the documents or web pages in the document collection or web site.

Each of the connected to or linked to documents or web pages are then selected. The connections or links on each of the connected to or linked to documents or web pages are then identified and the information indicating the association between the connected to, or linked to documents or web pages is stored in the topology matrix. Continual looping may be avoided by maintaining a list of documents or web pages already visited. The process repeats for all connected to or linked to documents or web pages reachable via a threshold number of traversals from the initial document or web page. In this way the exemplary topology matrix data structure may be developed automatically. In various alternative embodiments of this invention, the information for the topology matrix data structure may be supplied by any other tool or utility such a web crawler or the information may be provided by the web site designer. The topology matrix represents the documents or web pages that can be reached from an initial starting document or page. After determining the topology matrix, control continues to step S30.

The content of each of the content portions, documents or web pages making up the document collection are determined in step S30. The words on each content portions, document or web page are added to a word/document frequency matrix. The weights of the words are determined and a weighted word document frequency matrix is created. The weighting may use term frequency/inverse document frequency (TF·IDF) log of the term frequency, $1+(\log_{10}$ of the term frequency) or any other known or later developed technique of weighting. Control then continues to step S40.

In step S40 the usage of the web site is determined by for example, analyzing the document server or web server access information. The document server or web server access information indicates the connected to or linked to document or web page which a user used to traverse into the site, the connected to or linked to document or web page, the date and time as well as machine address information. Information about the type and/or version of the user's browser may also be recorded.

The machine address information can be used to provide an indication of the path of users between the documents or web pages identified in the document server, or web server access information. The user path information may be further analyzed using the techniques described in Pitkow et al., "Mining Longest Repeating Sub-sequences To Predict World Wide Web Surfing" in Proceedings of USITS' 99: The $2^{nd}$ USENIX Symposium on Internet Technologies and Systems, USENIX Association, 1999; and Pirolli et al. "Distributions of Surfers' Paths Through the World Wide Web: Empirical Characterization", World Wide Web 2(1-2):29-45 each incorporated herein by reference in its entirety. Control then continues to step S50 where the significant usage information including user path information is determined using the longest repeating sequence techniques.

In step S50, a longest repeating sub-sequence of documents or web pages is a sequence of consecutive documents or web pages accessed by a user and where each document or web page appears at least some number of times greater that is than a threshold level, and where the sequence appears at least twice.

Once the significant user paths have been determined using the longest repeating sequence techniques, control is transferred to step S60 where the first of the determined user paths is selected. Control then continues to step S70.

In step S70, the information need associated with the selected user path is determined. The information need may be determined using co-pending application "SYSTEM AND METHOD FOR INFERRING USER INFORMATION NEED IN A HYPERMEDIA LINKED DOCUMENT COLLECTION" by Ed Chi et al., filed Mar. 31, 2000, as U.S. application Ser. No. 09/540,063, now U.S. Pat. No. 7,017,110 incorporated herein by reference in its entirety. It will be apparent that the information need may be determined using any known or later developed technique of determining user information need. The determination of information need is further discussed with respect to FIG. 3. The determination of information need accepts a user path and indicates the user information need for the path by returning a weighted group of keywords describing the user information need. The weighted group of keywords reflecting the information need is stored as a multi-modal information need feature vector for the user path. Control then continues to step S80.

The multi-modal feature vectors for each document in the user path are determined in step S80. The multi-modal feature vectors of the exemplary embodiment comprise for example, a multi-modal content feature vector reflecting the content of the words contained by each document or web page in the path. In one of the various exemplary embodiments according to this invention, a multi-modal URL feature vector reflecting words within the URLs contained by each document or web page is also provided. The "/" and "." contained within URLs are used to define word boundaries. In this way, the word content of the URLs may be determined and a multi-modal feature vector determined.

An inlinks multi-modal feature vector that indicates the inward connections or inlinks into each of the documents or web pages along the selected user path is also determined. The inward connections or inlinks are easily determined by, for example, examining the topology data structure of the document collection or web site and identifying which documents or web pages have entries indicating a link into the selected document or web page along the selected user path. Similarly, an outlinks multi-modal feature vector indicating outward connections or outlinks for each document or web page along the selected user path is also determined. It will be apparent that any other set of known or later identified features of a document or web page may be used to determine a multi-modal vector without departing from the spirit or scope of this invention.

The document path position weighting is then determined. The path position weighting may for example adjust the weighting to provide a greater weighting for document information appearing later in the path under the assumption that information accessed farther along a path more closely reflects the user's information needs. Alternatively, a mathematical function assigning asymptotically greater weight to information appearing later along the path or any other known or later developed technique may be used to provide path position weighting according to this invention.

The document access weighting is also determined. For example, the document access weighting may be determined by analyzing usage information such as a document server, electronic library log file or web server access information to determine how many times each document or web page has been accessed. A weighting function is then developed based on this information. For example, a document weighting function might lower the weighting associated with a document or web page that is accessed by every user path under the assumption that the document or page is a splash screen or entry document or web page that every user of the site must visit to start the user path traversal. After document access weighting has been determined, control continues to step S90.

In step S90, a user profile vector is determined based on the path position weighting and document access weighting. Control is then transferred to step S100. In step S100 a determination is made whether additional user paths remain to be processed. If a determination is made that additional user paths remain to be processed, control continues to step S110. In step S110 the next user path is selected and control jumps to step S70 where the process repeats. When step S100 determines that no additional user paths remain to be processed, control continues to step S120 where a multi-modal similarity function is determined.

Since each of the modes of the multi-modal vector define a unique dimensional space, consecutive multi-modal vectors may be transformed to occupy a new dimensional space having a number of dimensions equal to the sum of the number of dimensions of each multi-modal vector. In this way, dissimilar information may be aggregated and compared using vectors. Accordingly, a similarity function may be defined to be the cosine of the angle between any two multi-modal vectors in this new dimensional space. However, it will be apparent that any known or later developed method of determining the similarity between vectors may be used to determine a multi-modal similarity function according to this invention. Control then continues to step S130.

In step S130 the weighting of the multi-modal features is determined. For example, in some situations it may be desirable to assign a greater weighting to the content features than to the URL features. Similarly, at other times, it be desirable to assign a greater weighting to the inlink and outlink features. Once the weighting of the multi-modal features is determined control continues to step S140 where the type of clustering to perform is determined.

In the exemplary embodiment according to this invention, a choice between K-Means clustering and Wavefront clustering is determined. Multi-Modal Clustering is further discussed in the co-pending related application entitled "SYSTEM AND METHOD FOR IDENTIFYING SIMILARITIES AMONG DOCUMENTS IN A COLLECTION", by H. Schuetze et al., filed Oct. 19, 1999 as U.S. application Ser. No. 09/425,039; and "SYSTEM AND METHOD FOR CLUSTERING DATA OBJECTS IN A COLLECTION", Schuetze et al., filed Oct. 19, 1999, now issued as U.S. Pat. No. 6,598,054, incorporated herein by reference in its entirety. However, it will be apparent that any type of clustering, such as Hierarchical Clustering, known or later developed may be used according to this invention.

If the determination is made at step S140 that Wavefront clustering is to be used, then control continues to step S150. In step S150, a global centroid cluster is determined. Control then continues to step S160.

In step S160, some N random vectors are selected and control continues to step S170. N can be user specified. In step S170 cluster centers are selected between each random vector and the global centroid and control continues to step S180 where a measure of similarity between the vectors is selected.

The measure of similarity may be user selected using a drop down dialog box, pop-up dialog box or any other known or later developed technique for entry of the measure of similarity value. In various alternate embodiments of this invention, the similarity value may be a default value changeable by the user. After selection of the measure of similarity value, control continues to step S190.

In step S190 the multi-modal feature vectors having the selected measure of similarity with the cluster center vectors based on the multi-modal feature vector similarity function are averaged. Control then continues to step S230 where the cluster centers vectors are analyzed to determine user profile types.

The analysis may include for example, mathematical processing such as the application of smoothing functions using Gaussian or Log-Normal distributions. Control is then transferred to step S240 and the process ends.

However, if it is determined in step S140 that K-Means clustering should be used, control continues to step S200 where random vectors are selected as cluster centers. Control then continues to step S210.

In step S210 a measure of similarity is selected. As discussed above, the measure of similarity may be selected using any known or later developed method of determining user input such as pop-up dialog box and field entry. The measure of similarity may be a default value that may be overridden be a user. Once the measure of similarity is selected control continues to step S220 where the average of all vectors having the selected measure of similarity with each of the cluster centers, based on the multi-modal vector similarity function is determined.

The average may be performed by summing each individual vector and then dividing the sum by the number of total number of vectors or any other known or later developed methods. Control then continues to step S230.

In step S230, the user profile types are determined by analyzing the cluster center vectors. Thus, an information architect or web site designer is provided an indication of the types of user profiles using the document collection or web site.

Figure 2:
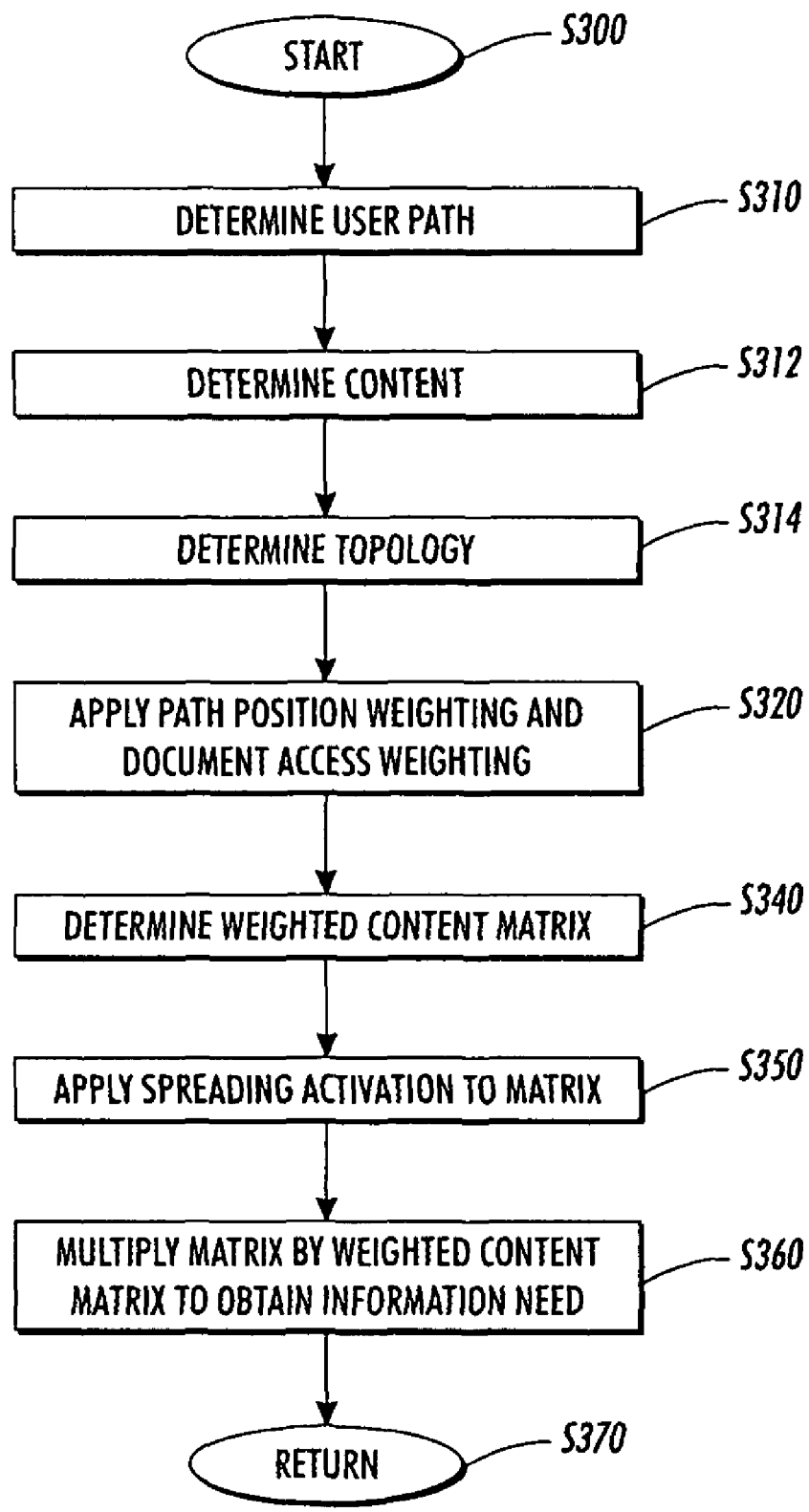
FIG. 2 is an exemplary flowchart of a method for inferring user information need from a user path according to this invention.

FIG. 2 shows a flowchart of an exemplary method of inferring user information. The process starts at step S300 and continues to step S310.

In step S310, a user path E is selected. In the exemplary embodiment, the user path is determined using the longest repeating sequence techniques as described above in regard to step S50 of FIG. 1. Control then continues to step S312 where the content information for the document collection or web site is determined.

In the exemplary embodiment according to this invention, the content information is obtained from the stored content information determined in step S30 of FIG. 1. However, it will be apparent that any method of obtaining the content information may be used such as providing the content information as a parameter to the process of inferring user information need or by re-determining the content information as required. Control then continues to step S314 where the topology of the document collection or web site, is determined.

As discussed above it will be apparent that any method of obtaining the topology information may be used such as providing the topology information as a parameter to the process of inferring user information need, re-determining the topology information as required and/or retrieving the topology information stored in memory by step S20 of FIG. 1. Control then continues to step S320 where the path position weighting and document access weighting are determined for the documents in the selected user path. Control then continues to step S340.

In step S340, a weighted content data structure is determined. The weighted content data structure may be a word×document matrix (weighted content matrix W), a word×document adjacency list or any other known or later developed technique for storing the content information about the document collection or web site page. Control then continues to step S350.

In step S350 spreading activation according to the following formulas (1-2) is applied to generate initial document vector A.

$$A(1) = \text{ALPHA} * \text{Matrix } S * E \quad (1)$$

$$A(t) = \text{ALPHA} * \text{Matrix } S * A(t-1) + E \quad (2)$$

The formula is applied t number of times where the matrix S reflects the topology matrix and vector E reflects the user path. The value ALPHA reflects the probability a user will click through to a document or web page and therefore ranges between 0 and 1. Control then continues to step S360.

In step S360, the document vector A is multiplied by the weighted content matrix W to determine the user's information need based on the user path to create an information need keyword vector. The weighted content matrix W is obtained from the content information obtained from step S30. W is a matrix of words×documents, where the entries specify the frequency of the word in a given document. The words may then be weighted by any known techniques for weighting, such as the well-known in the art TF.IDF, or later developed technique for weighting. The most relevant keyword information is then indicated by higher number entries in the information keyword vector position. Control then continues to step S370 where the process ends and control is returned to the calling step S70 of FIG. 1.

Figure 3:
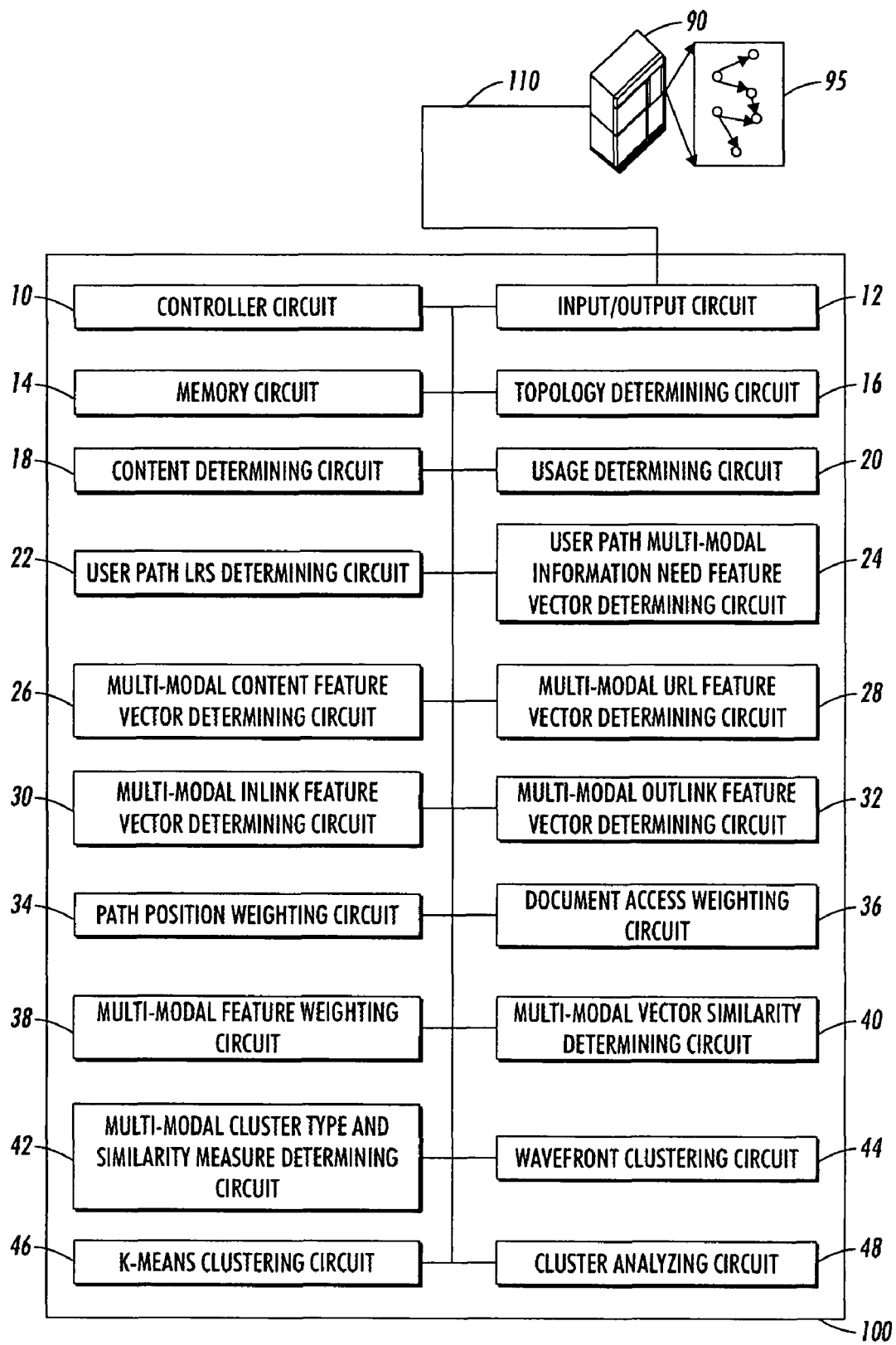
FIG. 3 is an exemplary embodiment of a system for identifying user types using multi-modal clustering and information scent according to this invention.

FIG. 3 shows an exemplary embodiment of a system for identifying user types using multi-modal clustering and information scent 100 comprising a controller circuit 10; an input/output circuit 12 for connecting to communications link 110; a memory circuit 14; a topology determining circuit 16; a content determining circuit 18; a usage determining circuit 20; a user path longest repeating sub-sequence determining circuit 22; a user path multi-modal information need feature vector determining circuit 24; a multi-modal content feature vector determining circuit 26; a multi-modal uniform resource locator feature vector determining circuit 28; a multi-modal inlink feature vector determining circuit 30; a multi-modal outlink feature vector determining circuit 32; a path position weighting circuit 34; a document access weighting circuit 36; a multi-modal feature weighting circuit 38; a multi-modal vector similarity determining circuit 40; a multi-modal cluster type and similarity measure determining circuit 42; a wavefront clustering circuit 44; a k-means clustering circuit 46 and a cluster analyzing circuit 48. The system for identifying user types using multi-modal clustering and information scent 100 is connected via communications link 110 to document collection server or web server 90. The document collection or web server 90 provides access to documents or web pages in the document collection or web site 95.

The controller 10 activates the topology determining circuit 16 to retrieve each document or web page of the document collection or web site 95 through document server or web server 90 over communications link 110 and input/output circuit 12. The retrieved documents or web pages are analyzed to determine the connections or links between each document or web page of the document collection or web site. The topology information is then stored in an exemplary topology storage data structure in memory 14. It will be apparent that the topology data structure may be a matrix structure, adjacency list or any other known or later developed technique for storing information about the connection or link information between documents or web pages.

The content determining circuit 18 is also activated to determine the content of each of the retrieved documents or web pages. For example, in one exemplary embodiment of the system for identifying user types using multi-modal clustering and information scent 100 according to this invention, the words in each document or web page and their frequency of occurrence is determined by document or web page. It will be apparent that the content determining circuit may be activated as each document or web page is retrieved by the topology determining circuit 16 or may be activated after the topology of the document collection or web site has already been determined without departing from the spirit or scope of this invention.

Usage determining circuit 20 is then activated to determine the user path traversals of the document collection or web site 95, from the document server or web server 90 access log information. The document server or web server 90 access information contains information about each machine that has accessed the document collection or web site 95 through document server or web server 90.

The user paths are then transferred to the user path longest repeating sub-sequence determining circuit 22. As discussed above, the longest repeating sub-sequence is the longest user traversal of a set of connected documents or web pages, such that the threshold number of users have traversed the same sub-sequence. The determination of longest repeating sub-sequence filters out less relevant or less important information to facilitate the identification of significant user paths from the user path information.

For example, when a user views a document or web page of the document collection or web site 95 through the document or web server 90, the user's machine identification information, referred by document, referred to document, browser type and date and time are saved in the document server or web server access information. As a user traverses the site from an initial entry page, a user path is generated in the access information. The path is identified by the machine identification information and indicates the previous document or web page and current document or web page in the referred by document field and the referred to document field of the document server or web server 90 access information. The user path longest repeating sub-sequence circuit determining circuit 22 identifies user paths that exceed the threshold level and which are the longest sub-sequences. These identified paths are then stored in memory circuit 14.

The user path multi-modal information need feature vector determining circuit 24 is then activated. The user path multi-modal information need feature vector determining circuit 24 identifies the information need keywords associated with a user path using the techniques described in co-pending application, "SYSTEM AND METHOD FOR INFERRING USER INFORMATION NEED IN A HYPERMEDIA LINKED DOCUMENT COLLECTION" by Ed Chi et al., filed Mar. 31, 2000, as U.S. application Ser. No. 09/540,063, now U.S. Pat. No. 7,017,110, incorporated herein by reference in its entirety. The user path multi-modal information need feature vector determining circuit 24 stores the information need keyword information in memory 14 indicating the most relevant keywords for the user path. In the exemplary embodiment of the system according to this invention, the value of a given position in the information need keyword vector indicates how relevant the associated keyword is to the user path. For the exemplary vector B having the following six entries, [1 2 5 99 1 50], the vector positions 4 and 6 represent the two most relevant keywords. These vector positions might, for example, represent "chocolate" and "souflee".

The controller circuit 10 then activates the multi-modal content feature vector determining circuit 26 to break each retrieved document or web page of the document collection or web site 95 into constituent words. The words may then be weighted according to any known or later developed technique for weighting. For example, term frequency or inverse document frequency weighting may be used. The content information is then represented in the form of a multi-modal content feature vector as further described in "SYSTEM AND METHOD FOR QUANTITATIVELY REPRESENTING DATA OBJECTS IN VECTOR SPACE", by H. Schuetze et al., filed Oct. 19, 1999, as U.S. application Ser. No. 09/421,416, now U.S. Pat. No. 6,922,699, incorporated herein by reference in its entirety. A multi-modal vector allows different types of information representing the document collection to be combined and operated upon using a unified representation.

The multi-modal uniform resource locator feature vector determining circuit 28 is then activated. The multi-modal uniform resource locator feature vector determining circuit 28 determines features of the uniform resource locators that appear in each document or web page. The uniform resource locators are broken into constituent words and the words are weighted according to frequency. For example, a uniform resource locator such as "http:www.xerox.com/index.html" would be broken up into the words "http", "www", "xerox", "com", "index" and "html". A vector describing the weighted presence of the words appearing in the uniform resource locators is determined.

The multi-modal inlink vector determining circuit 30 is then activated. The multi-modal inlink feature vector determining circuit 30 determines the inlinks or inward uniform resource locators that refer to the current document or web page in the document collection or web site 95. For example, the topology matrix of the document collection or web site 95 may be examined to determine which documents or web pages contain connections or links to the current document or web page. Since uniform resource locators may refer to a specific paragraph within a document or web page, each of the referring documents or web pages is analyzed to determine the uniform resource locator including any paragraph information. Also, since the inlink may reference a relative uniform resource locator instead of a full path, the multi-modal inlink feature vector determining circuit 30 determines the full path of the uniform resource locator so that a fully normalized weighting of the uniform resource locator may be determined. The multi-modal inlink vector determining circuit 30 then determines a multi-modal inlink feature vector from the relevant weighting of uniform resource locators.

Similarly the multi-modal outlink vector determining circuit 32 is activated to determine the outlinks or outward uniform resource locators that are referred to by the current document or web page in the document collection or web site 95. It will be apparent that the multi-modal outlink feature vector determining circuit 32 may be activated before, after or at the same time as the multi-modal content feature vector determining circuit 26 is activated.

The path position weighting circuit 34 is then activated to determine the relative weighting to associate with each document or web page in the user path. For example, in one of the various exemplary embodiments of the system for identifying user types using multi-modal clustering and information scent, the path position weighting circuit 34 assigns a weighting multiple to the document or web page that increases from the first document or web page accessed to the last document or web page accessed. This type of weighting provides a higher weighting to the most recently accessed information on the user path. However, it will be apparent that any type of path position weighting may be used in the practice of this invention.

The document access weighting circuit 36 is then activated to determine how frequently the user path document or web page has been accessed based on the determined usage information stored in memory 14. It will be apparent that any type of access weighting may be used without departing from the spirit or scope of the invention. The multi-modal content feature vector, multi-modal uniform resource locator feature vector, multi-modal inlink feature vector and the multi-modal outlink feature vector and the multi-modal information need feature vector for each document or web page on the user path are then combined using the document or web page path position and document access weighting. The combined multi-modal vector represents all of the features of the user path in a unified representation.

The multi-modal feature weighting circuit 38 allows the user to select a weighting for the multi-modal content feature vector, multi-modal uniform resource locator feature vector, multi-modal inlink feature vector, the multi-modal outlink feature vector and the user path multi-modal information need feature vector. Any method of selecting a weighting may be used, including but not limited to a drop down dialog box to select an entry, a text entry box or any other known or later developed technique for selecting and/or entering multi-modal feature weighting information.

The multi-modal vector similarity determining circuit 40 is then activated to select the similarity function that will be used to define similarity between any of the multi-modal vectors. In one of the various exemplary embodiments of the system for identifying user types using multi-modal clustering and information scent 100, the similarity function is a combination of the similarity functions for the multi-modal content feature vector, multi-modal uniform resource locator feature vector, multi-modal inlink feature vector, the multi-modal outlink feature vector and the multi-modal information need feature vector after the modal feature weights have been applied. In this way, the user may change the similarity function constraints for the multi-modal content feature vector while leaving the similarity function constraints for the multi-modal inlink feature vector at the initial setting. It will be apparent that any or all of bases for determining similarity between the multi-modal content feature vector, multi-modal uniform resource locator feature vector, multi-modal inlink feature vector, the multi-modal outlink feature vector and the multi-modal information need feature vector may be changed. As discussed above, any technique for selecting a similarity function may be used, including but not limited to, drop down dialog boxes, text entry pop-up boxes or any other known or later developed technique.

The multi-modal cluster type determining circuit 42 is activated to determine what type of multi-modal clustering has been selected and to determine the required measure of similarity between the multi-modal vectors. The multi-modal cluster determining circuit 42 allows the user of the system for identifying user types using multi-modal clustering and information scent 100 to over-ride the default or pre-set multi-modal clustering setting. The multi-modal cluster determining circuit 42 also provides the user the ability to set the required measure of similarity. For example, Wavefront multi-modal clustering with a measure of similarity of 0.7 may be the default. The similarity measure of 0.7 reflects the measure of similarity that must be determined between two vectors for the vectors to be clustered together. If required, the user may override the Wavefront cluster type to select K-Means multi-modal clustering instead. Differing measures of similarity may also be selected. The selection may be via a pop-up dialog box, text entry or any other known or later developed technique. It will also be apparent that any type of multi-modal clustering known or later developed may be used in the practice of this invention.

If multi-modal wavefront clustering is selected the wavefront clustering circuit 44 is activated. Wavefront clustering then begins with the accumulated determined user paths represented by the weighted multi-modal vectors. The wavefront clustering circuit 44 determines a global centroid vector. Random vectors are then determined. Cluster centers are selected between the global centroid and the random vectors. The average of vectors having the selected measure of similarity with the cluster centers based on the selected multi-modal similarity function is determined and stored in memory 14.

If the K-Means clustering is selected, the k-means clustering circuit 46 is activated and K-Means clustering begins with the accumulated user paths represented by the weighted multi-modal vectors. Random vectors are selected as cluster centers. The average of vectors having the selected measure of similarity with the cluster centers based on the selected multi-modal similarity function is determined and stored in memory 14.

The cluster analyzing circuit 48 is then activated. The cluster analyzing circuit 48 then determines user types based on the clustered multi-modal user path information. For example, based on the average multi-modal clustering information, a set of information need keywords may be identified from the averaged multi-modal information cluster vector. These information need keywords describe the user types accessing the document collection or web site.

Figure 4:
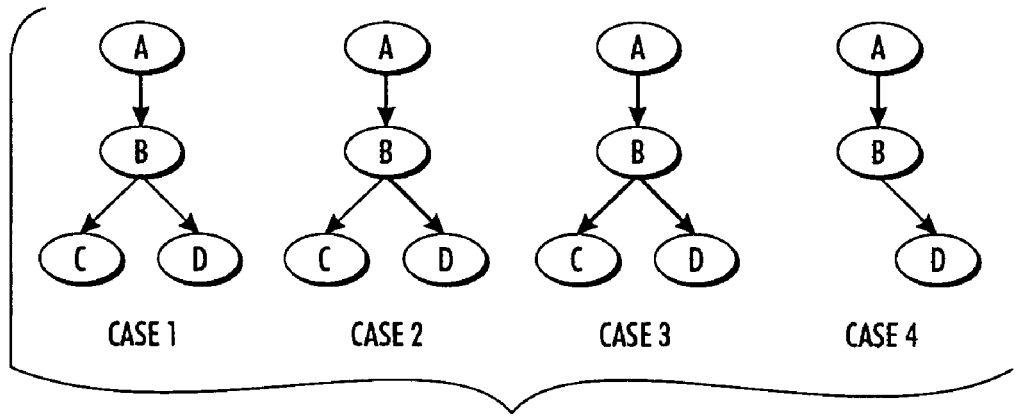
FIG. 4 shows exemplary longest repeating sub-sequences.

FIG. 4 shows exemplary longest repeating sub-sequences. For example, in a document collection containing 4 documents A-D and topological connections between A-B, B-C and B-D in the document collection. If one user traversal is represented by the path A-B-C and another user traversal by the path A-B-D, then only the sub-sequence A-B reflects the traversal of more than one user. Therefore the path A-B is the longest repeating sub-sequence.

In a second example, if a third user path A-B-D is added to the paths discussed above, the longest repeating sub-sequences are A-B-D and A-B. The path A-B-D reflects the second traversal over the path which therefore exceeds the requirement of at least two repetitions. The previously identified common sequence A-B is also further increased over the at least two repetitions and is therefore also a longest repeating sub-sequence.

In a third example, if a fourth user path A-B-C is added to the paths discussed above, the longest repeating sub-sequences would be A-B, A-B-C and A-B-D. In a fourth example, if two user paths exist over A-B and 2 user paths exits over A-B-D, then A-B is not a longest repeating sub-sequence since the path A-B-D is longest. Using these techniques significant user paths from the document server or web server access information can be determined.

Figure 5:
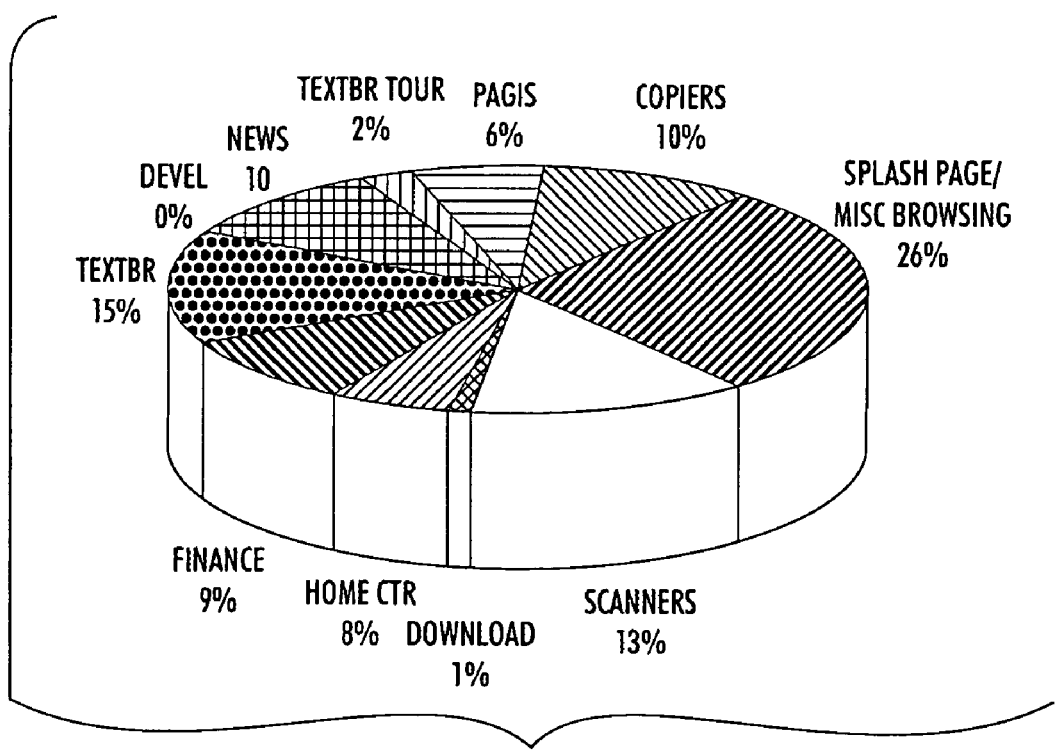
FIG. 5 shows an exemplary clustering of user types for a document collection or web site according to an embodiment of this invention.

FIG. 5 shows an exemplary clustering of user types for a document collection or web site according to a first embodiment of this invention. The user types are clustered showing that 9% of user paths indicated an interest in Finance, 8% an interest in the HomeCentre product, 1% in Downloading Software, 13% in scanners, 15% in the TextBridge product, 0% in Development Tools, 10% in Company News information, 2% in the TextBridge Demo, 6% in the Pagis product, 10% in copiers and 26% in miscellaneous browsing.

Figures 6, 7:
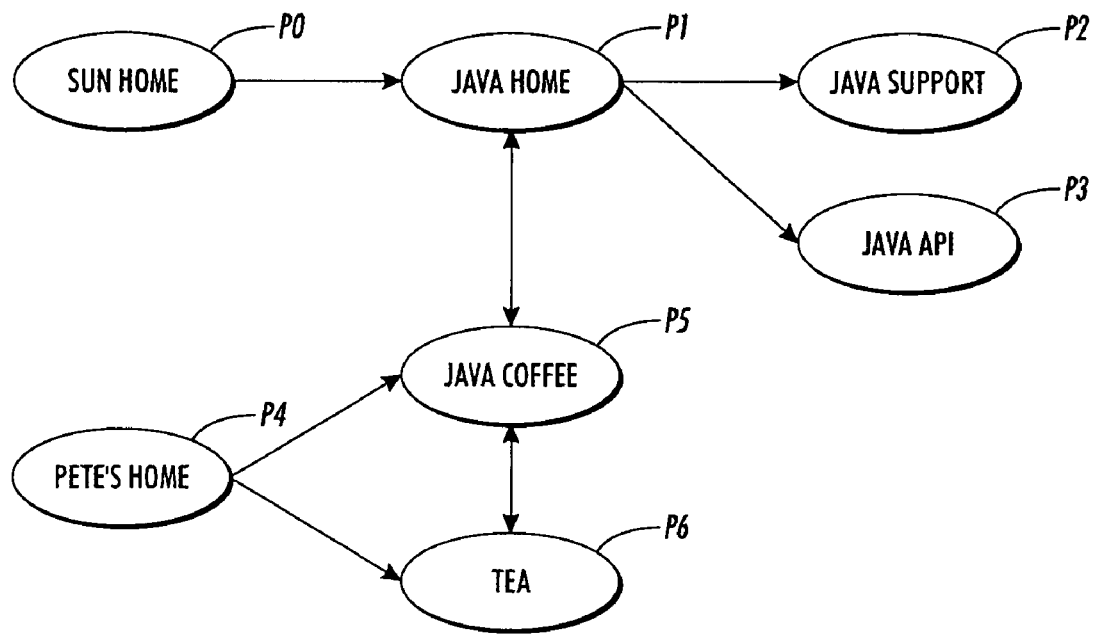
FIG. 6 shows an exemplary graph showing the connecting links between an exemplary set of documents or web pages.
FIG. 7 shows an exemplary embodiment of a topology matrix data structure showing the connecting links between an exemplary set of documents or web pages according to this invention.

FIG. 6 shows an exemplary graph showing the connecting links between an exemplary set of documents or web pages.

FIG. 7 shows an exemplary topology matrix T according to this invention. The topology matrix stores information about the connections between the documents or web pages. Non-zero entries in the topology matrix indicate links for which proximal and distal scent matrix entries will be calculated.

In the various exemplary embodiments outlined above, the system for predicting the usage of the a web site 100 can be implemented using a programmed general purpose computer. However, the system for predicting the usage of the a web site 100 can also be implemented using a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 2-5 can be used to implement the system for predicting the usage of the a web site 100.

Each of the circuits 10-48 of the system for identifying user types using multi-modal clustering and information scent 100 outlined above can be implemented as portions of a suitably programmed general purpose computer. Alternatively, circuits 10-48 of the system for identifying user types using multi-modal clustering and information scent 100 outlined above can be implemented as physically distinct hardware circuits within an ASIC, or using a FPGA, a PDL, a PLA or a PAL, or using discrete logic elements or discrete circuit elements. The particular form each of the circuits 10-48 of the system for identifying user types using multi-modal clustering and information scent 100 outlined above will take is a design choice and will be obvious and predicable to those skilled in the art.

Moreover, the system for identifying user types using multi-modal clustering and information scent 100 and/or each of the various circuits discussed above can each be implemented as software routines, managers or objects executing on a programmed general purpose computer, a special purpose computer, a microprocessor or the like. In this case, the system for identifying user types using multi-modal clustering and information scent 100 and/or each of the various circuits discussed above can each be implemented as one or more routines embedded in the communications network, as a resource residing on a server, or the like. The system for identifying user types using multi-modal clustering and information scent 100 and the various circuits discussed above can also be implemented by physically incorporating the system for identifying user types using multi-modal clustering and information scent 100 into a software and/or hardware system, such as the hardware and software systems of a document server, web server or electronic library server.

As shown in FIG. 3, the memory circuit 14, can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a write-able or rewrite-able optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The communication links 110 shown in FIG. 3 can each be any known or later developed device or system for connecting a communication device to the system for identifying user types using multi-modal clustering and information scent 100, including a direct cable connection, a connection over a wide area network or a local area network, a connection over an intranet, a connection over the Internet, or a connection over any other distributed processing network or system. In general, the communication link 110 can be any known or later developed connection system or structure usable to connect devices and facilitate communication Further, it should be appreciated that the communication link 110 can be a wired or wireless link to a network. The network can be a local area network, a wide area network, an intranet, the Internet, or any other distributed processing and storage network.

While this invention has been described in conjunction with the exemplary embodiments outlines above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for identifying user types in a collection of connected content portions, comprising:
    determining a topology data structure by identifying connections or links between content portions;
    determining at least one significant user path among a plurality of user paths between connected content portions in the determined topology data structure, the connected content portions being content portions connected to or linked to other content portions and reachable via a threshold number of traversals by a user from an initial content portion in the topology data structure, the at least one significant user path defined by accesses to the connected content portions by the user;
    determining a multi-modal user path user information need for each at least one significant user path in the topology data structure;
    for each content portion comprising each of the at least one significant user path, determining a multi-modal content portion feature information including a content feature information and at least one of connection feature information, inward connection feature information and outward connection feature information, which wherein for a selected content portion, the connection feature information indicates a connection that appears on the selected content portion, the inward connection feature information indicates a connection that refers to the selected content portion in the collection of connected content portions, and the outward connection feature information indicates a connection that is referred to by the selected content portion in the collection of connected content portions;
    combining each multi-modal content portion feature information for the user path with the multi-modal user path user information need into a multi-modal user path information;
    determining a similarity function and a measure of similarity for the multi-modal user path information;
    determining a multi-modal clustering type;
    clustering the multi-modal user path information based on the multi-modal clustering type, the similarity function and the measure of similarity; and determining user types based on the clustered multi-modal user path information;
    wherein determining the inward connection feature information and the outward connection feature information further comprises normalizing the inward connection feature information and the outward connection feature information; and
    wherein each content portion in the user path is weighted using at least one of a content portion access frequency weighting, a weighting of the content portion based on content portion position in the user path.

2. The method of claim 1, wherein determining significant user paths uses the longest repeating sub-sequences.

3. The method of claim 1, wherein determining content feature information is based on weighted word frequency of each content portion.

4. The method of claim 1, wherein determining the connection feature information comprises breaking the connection portion into constituent words using "/" and "." as word boundaries.

5. The method of claim 1, wherein the similarity functions is based on determining the cosine between two multi-modal vectors.

6. The method of claim 1, wherein the multi-modal clustering type is at least one of K-means clustering, wavefront clustering.

7. The method of claim 1, wherein each multi-modal feature vector may be independently weighted.

8. A system for identifying user types in a collection of connected content portions, comprising:
    a controller circuit, a memory circuit, and an input/output circuit;
    a multi-modal clustering type determining circuit that determines a multi-modal clustering type;
    a content determining circuit;
    a user path determining circuit that determines a topology data structure by identifying connections or links between content portions and determines at least one significant user path among a plurality of user paths between connected content portions in the determined topology data structure, the connected content portions being content portions connected to or linked to other content portions and reachable via a threshold number of traversals by a user from an initial content portion in the topology data structure, the at least one significant user path defined by accesses to the connected content portions by the user;
    a multi-modal user path user information need determining circuit that determines a user information need for each significant user path in the topology data structure, the user information need including a value that reflects a probability that a user will browse through a content portion in at least one significant user path, multi-modal content portion feature information determining circuits that determine multi-modal content information and at least one of, multi-modal connection, multi-modal inward connection and multi-modal outward connection feature information for each content portion comprised in a user path, wherein for a selected content portion, the connection feature information indicates a connection that appears on the selected content portion, the inward connection feature information indicates a connection that refers to the selected content portion in the collection of connected content portions, and the outward connection feature information indicates a connection that is referred to by the selected content portion in the collection of connected content portion;

wherein the controller combines each multi-modal content portion feature information for the user path with the multi-modal user path user information need into a multi-modal user path information;

a similarity function determining circuit for determining similarity between two multi-modal information;

a multi-modal clustering circuit that clusters the multi-modal user path information based on the multi-modal clustering type, the similarity function and a specified measure of similarity; and a cluster analyzing circuit that determines user types based on the clustered multi-modal user path information;

wherein the multi-modal inward connection feature determining circuit and the multi-modal outward connection feature determining circuit normalize the inward connection feature information and the outward connection feature information; and wherein each content portion in the user path is weighted by at least one of a content portion access frequency weighting circuit that weights the content portion based on access frequency, a path position weighting circuit that determines a weighting based on the position of the content portion within the user path.

9. The system of claim 8, wherein the user path determining circuit determines significant user paths using the longest repeating sub-sequences.

10. The system of claim 8, wherein the multi-modal content feature information determining circuit determines words based on weighted word frequency of each content portion.

11. The system of claim 8, wherein the multi-modal connection feature information determining circuit determines connection features by breaking the connection portion or link into constituent words using "/" and "." as word boundaries.

12. The system of claim 8, wherein the similarity function determining circuit determines similarity based on the cosine between two multi-modal vectors.

13. The system of claim 8, wherein the multi-modal clustering type is at least one of K-means clustering, wavefront clustering.

14. The system of claim 8, further comprising a multi-modal feature weighting circuit that weights each multi-modal feature vector independently.

\* \* \* \* \*